Dec. 7, 1948.  M. RONNING ET AL  2,455,905
COMBINE
Filed Nov. 20, 1943  4 Sheets-Sheet 1
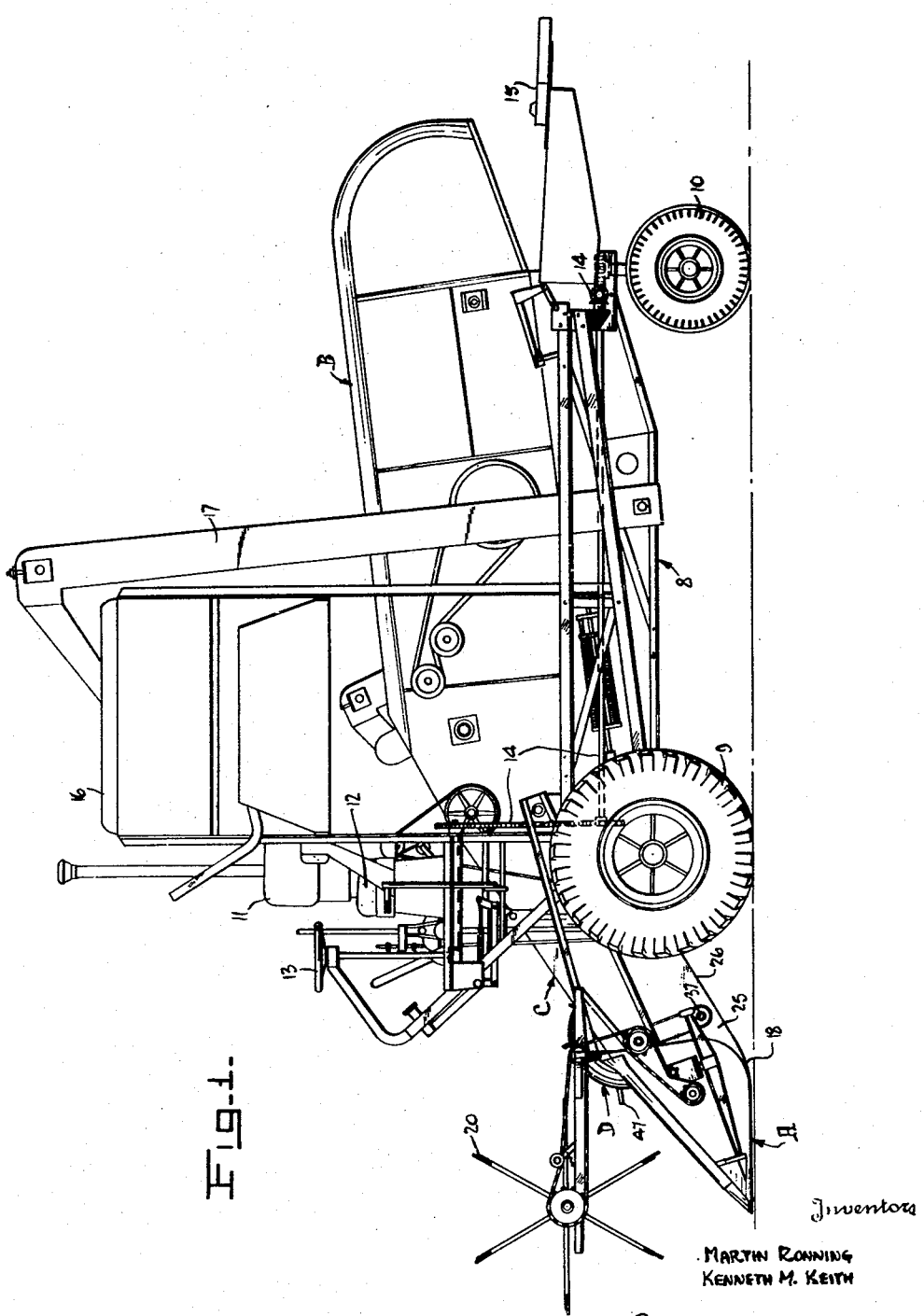

Dec. 7, 1948.  M. RONNING ET AL  2,455,905
COMBINE
Filed Nov. 20, 1943  4 Sheets-Sheet 2
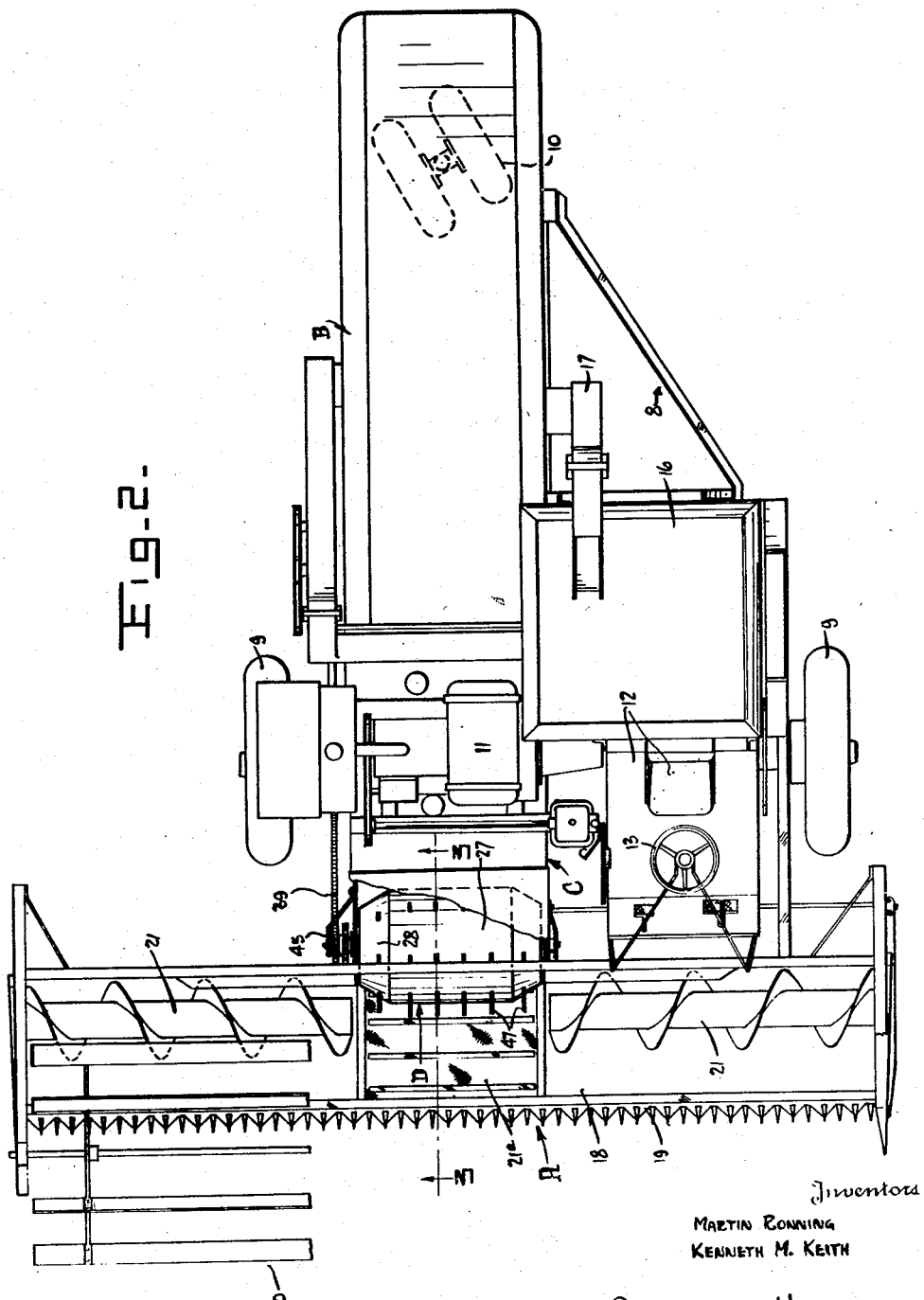

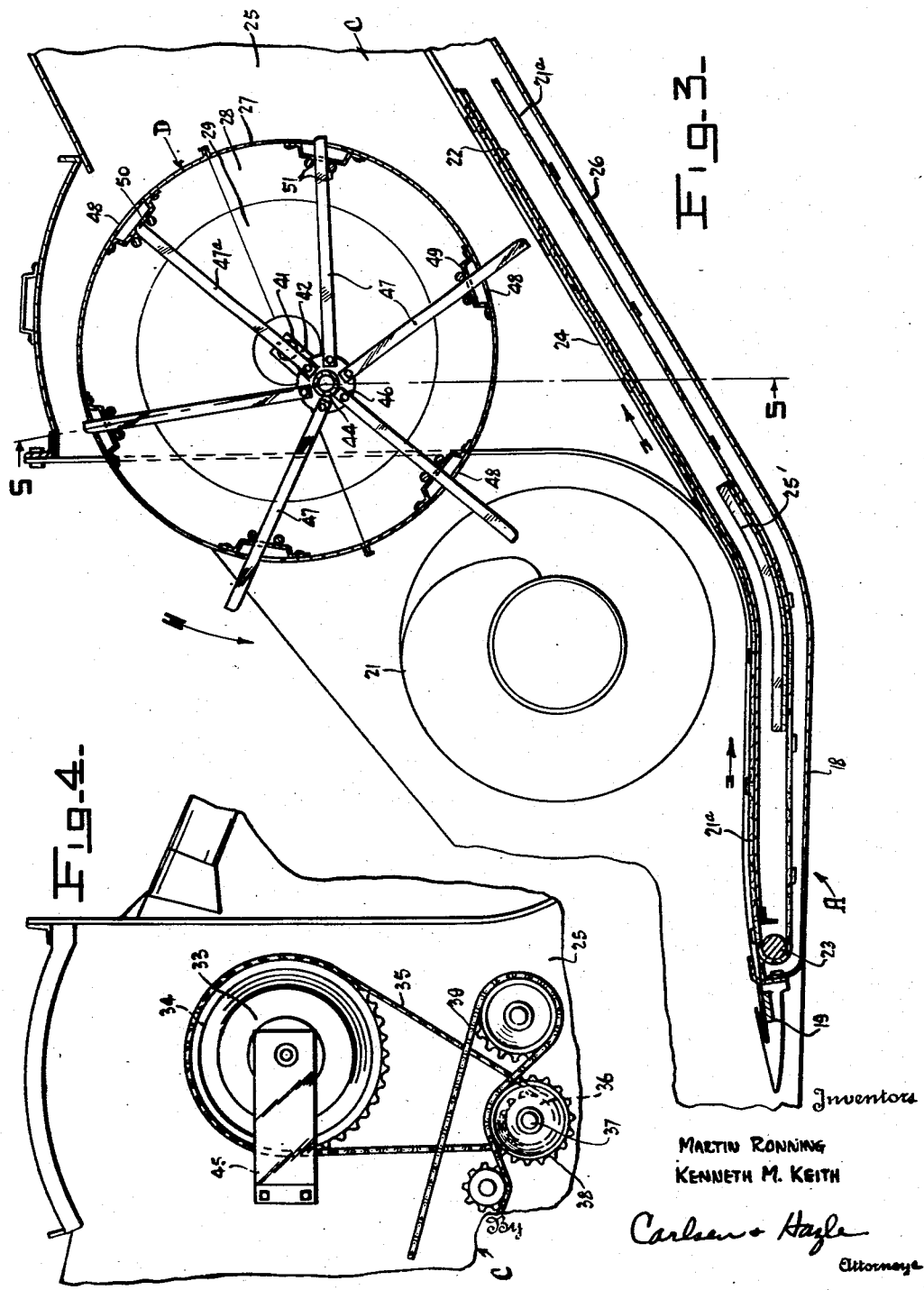

Dec. 7, 1948.　　　　M. RONNING ET AL　　　　2,455,905
COMBINE

Filed Nov. 20, 1943　　　　　　　　　　4 Sheets-Sheet 4

Inventors
MARTIN RONNING
KENNETH M. KEITH.

By Carlsen & Hagle
Attorneys

Patented Dec. 7, 1948

2,455,905

UNITED STATES PATENT OFFICE 2,455,905

COMBINE

Martin Ronning, St. Louis Park, and Kenneth M. Keith, Minneapolis, Minn., assignors to Minneapolis-Moline Power Implement Company, Minneapolis, Minn., a corporation of Delaware Application November 20, 1943, Serial No. 511,054

16 Claims. (Cl. 56—124)

This invention relates to grain combines of the self-propelled harvester-thresher type, and the primary object is to provide an improved type of mechanism for feeding or conveying the cut grain from the havester cutter bar and platform laterally and thence rearwardly onto the conveyor which elevates the crop into the threshing mechanism.

For many years it has been the practice in the industry to construct combines with a long cutter platform extending laterally from a conveyor housing into which the grain is fed by apron or auger conveyors that move the grain lengthwise of the pan. As the grain then enters the housing it is engaged by feeder-beaters that operate to kick the grain back onto an inclined endless conveyor which in turn elevates it into the thresher. Combines of this character are illustrated in United States Patents No. 1,959,689 to Ronning; No. 2,155,422 to Korsmo and Ronning, and Reissue No. 21,161 to Korsmo and Ronning. In such cases the feeder-beaters are operated at relatively high speeds and therefore have a tendency to throw or fan some of the grain forwardly as well as rearwardly. For that reason it has been necessary to provide an enclosing hood or housing that extends forwardly from the feeder housing, and it is this housing into which the grain is fed laterally as above noted.

While such construction has certain advantages it does have the disadvantage that the total width of the machine must include the width of the conveyor and housing in addition to the length of the cutter bar, because the presence of the housing prevents effective use of cutting mechanism directly in front of the thresher conveyor.

Various methods have been tried to overcome the aforementioned and other disadvantages inherent in that type of combine, and this has developed, in recent years, in several designs of so-called "straight through" combines in which much of the grain is cut immediately in front of and across the entire width of the thresher conveyor as well as to one or both sides thereof. In some of these machines no lateral platform conveyors are employed with a result that cutting widths are limited, even though angular deflectors are employed. In others one or two platform augers are used and the sickle bar extends not only throughout the length of such auger or augers but also extends across the entire width of the thresher conveyor. It is this latter type of machine with which the present invention is concerned, and we have developed what appears to be a novel and ingenious device to cooperate with other and associated mechanism to not only cut grain over the greatest possible width of the machine but to direct it laterally from either or both sides and join it with grain cut in advance of the thresher conveyor, for straight through delivery to the thresher, and without the necessity of employing rapidly rotating beaters and protective housings therefor. Generally speaking this device includes a rotary feeder drum or cylinder which travels at approximately the same surface speed as the thresher conveyor, and has a plurality of longitudinally and circumferentially spaced fingers which are automatically extended and retracted over predetermined travel periods whereby they will operate to engage the rearwardly and laterally incoming grain, feed it under and rearward, and then discharge it for further travel to the thresher under the action of an endless conveyor.

In the accompanying drawings, which illustrate a preferred embodiment of the invention—

Fig. 1 is a side elevation of a combine, as seen from the left.

Fig. 2 is a top or plan view of the machine shown in Fig. 1 with fractional parts broken away.

Fig. 3 is an enlarged detail elevation on line 3—3 in Fig. 2.

Fig. 4 is an enlarged detail elevation of a drive chain mechanism mounted on the right hand side of the feeder housing.

Figure 5:
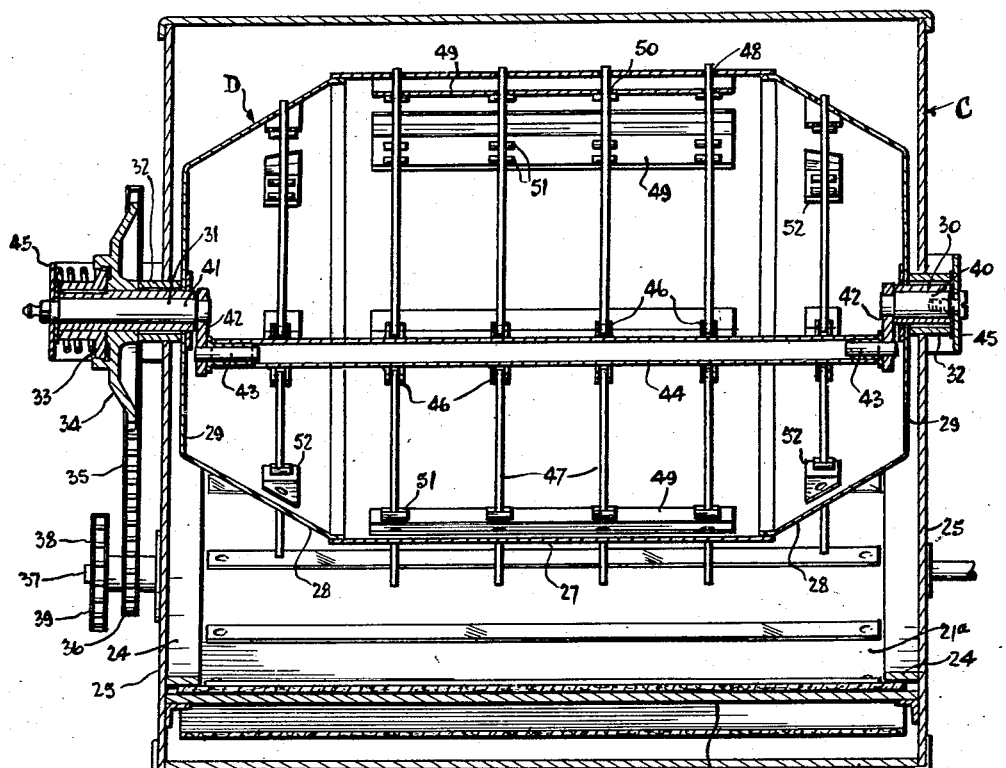
Fig. 5 is an enlarged sectional elevation as seen substantially on the irregular line 5—5 in Fig. 3.
Figure 6:
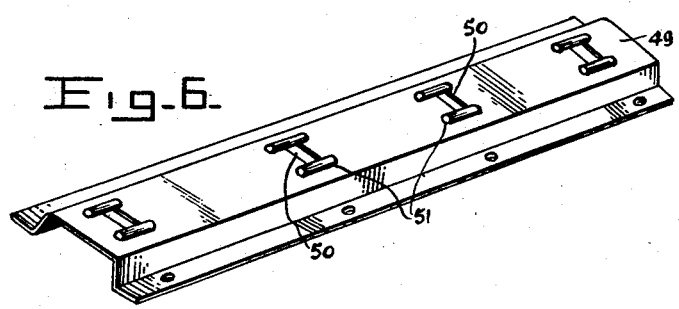
Fig. 6 is a perspective detail view of a guide bar device used interiorly of the feeder drum.

Referring to the drawings more particularly and by reference characters 8 designate the main frame of the machine, the same being supported by widely spaced forward driving wheels 9 and by a rearwardly disposed steering truck 10. An engine 11 provides power for propelling the wheels 9 as well as for operating the various cutting, feeding and threshing mechanisms, and this engine and the various mechanisms are adjusted from an operator's station 12. The machine is also steered from the same station, the operator controlling the truck 10 through hand wheel 13 and connections 14.

The combine proper includes a harvester A, which cuts the grain as the machine progresses over the field, a thresher B, which separates the grain from the straw, and a feeder housing C, through which the cut grain is conveyed from harvester to thresher. After separation the straw and chaff are discharged rearwardly, as at 15, while the clean grain is elevated into a hopper 16 by elevator 17.

The harvester, comprises the usual platform 18, which, in the present instance, extends laterally to both sides from the feeder housing, and has a cutter or sickle bar 19 which extends the entire width of the machine thus insuring a maximum width of cut. A conventional reel 20 moves the grain into proper cutting contact with the sickle, and as the grain is severed it falls back on the platform 18 where it is engaged by conveyors such as opposed augers 21 and by them conveyed inwardly or toward the center of the platform 18. These augers are supported only at their outer ends with a result that their inner ends are suspended or open and therefore readily discharge the grain at the inner or delivery ends.

A longitudinally extending endless conveyor 21ᵃ operates over a rearwardly inclined false bottom 22 of the housing C, to carry the grain up into the thresher, in well known manner, and this conveyor also extends with its lower end horizontally forwardly to a point immediately back of the cutter bar 19, as clearly shown in Figs. 2 and 3. The forward end of this conveyor passes around a roller 23, while the upper end passes over a similar but driven roller (not shown). The upper run of the apron 21ᵃ is held down in proper grain receiving position by lateral guide strips 24 secured to the side walls 25 of housing C, and the lower run of the apron is similarly guided, at the turning angle, by strips or curved guide members 25', which are spaced between the false bottom 22 and the real bottom 26 of the housing. It will thus be seen that the conveyor apron 21ᵃ will operate in the position shown in Fig. 3, and with the upper surface carrying the grain rearwardly and angularly upwardly to the separator, as indicated by the arrows.

Journaled for rotation in the forward part of the housing C, and spaced above the lower inclined portion of conveyor 21ᵃ, is a drum shaped feeder device D. This device consists of a main cylindrical shell 27 terminating in tapered or trunco-conical end portions 28, and having end walls 29 from which extend trunnions 30 and 31 that rotate in bearings 32 of the side walls 25. The trunnion 31 is driven through a slip clutch 33 by a sprocket gear 34. This gear is driven through sprocket chain 35 from a pinion 36 on shaft 37, shaft 37 in turn having a gear 38 meshing with chain 39 conveying power from the engine. It may here be noted that shaft 37 extends through to the opposite side of the housing (see Fig. 1) where it operates through suitable transmission to drive the reel 20 and cutter bar 19.

Returning now to the detailed construction and operation of the feeder D it will be noted that the trunnions 30 and 31 are tubular and serve as bearings for stub shafts 40 and 41 of crank arms 42. The arm 42 support aligned studs 43 which are inserted in and carry a tubular shaft or pipe 44. The shafts 40 and 41 extend outwardly beyond the trunnions 30 and 31 sufficiently to engage bracket arms 45, secured to the housing walls 25 (Fig. 4) and which have for their function to hold the cranks 42 against rotation when the drum 27 is being driven.

The pipe 44 is provided with a longitudinally spaced series of collars 46 to each pair of which is secured a circumferentially spaced series of arms 47. All of the arms of each series, except one, are pivoted to the collars so as to give them freedom for limited swinging movements. The exception in each series is an arm 47a (Fig. 3), attached rigidly to the collar, and has for its purpose to insure rotation of the pipe 44 on the studs 43 in synchronism with the drum. The arms, it will be noted, all project through slots 48 in the drum, and since the axis of pipe 44 remains fixed in an offset or eccentric position with respect to the axis of the drum the effect of the arrangement will be to project the arms 47 beyond the drum periphery, to form grain engaging fingers, during the downward and rearward movement of the drum rotation. Thus the cut grain accumulating at the central portion of the harvester will be positively engaged by the fingers and be fed downwardly and rearwardly into delivery contact with the conveyor apron 21ᵃ. The arms then retract as they start moving upwardly thus preventing any of the grain from continuing the rotation and returning to the forward side.

As it is desirable to completely retract the fingers within the drum, as indicated at the upper right in Fig. 3, we provide arm guides well within the drum periphery. These are in the form of channel members 49 which are riveted or welded to the drum interior and have slots 50 which register with the slots 48. Additionally, the members 49 are provided with bearing pins or abutments 51 which are secured at the ends of the slots 50 in a position to directly engage the edges of arms 47. These wear pins are of rounded and hardened material and have for their purpose to prevent wearing contact between the bars 47 and the edges of the slots 48 and 50.

Figure 7:
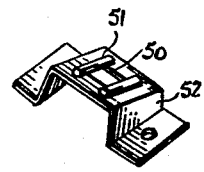
Fig. 7 is a perspective detail of an angular guide element used at the tapered ends of the drum.

In Fig. 7 is illustrated an angularly designed form of bracket 52 which is so shaped as to accommodate itself to the conical ends 28 of the drum while guiding the end series of arms 47.

The operation of the device while possibly obvious from the foregoing may be briefly restated as follows:

As the machine progresses over the grain field the sickle 19 severs a wide swath, and the reel 20 brushes the cut grain back upon and into contact with the auger conveyors 21 and the central conveyor 21ᵃ. The grain falling on apron 21ᵃ is immediately and continuously supplemented by the grain which is fed inwardly from both sides by the augers 21, and as the total volume of cut grain accumulates in this central zone in front of the drum D the fingers formed by the projected arms 47 reach forward to engage the grain and then by continuous rotation cause a constant and uniform feed of the grain to pass under the feeder drum and be deposited upon the apron 21ᵃ. With particular reference to Figs. 2 and 5 it may be explained that the tapered ends 28 of the drum are so disposed with respect to the discharge ends of the augers 21 as to combine with apron 21ᵃ in producing tapered or narrowing throats to better accommodate the laterally received grain, and then feed it rearwardly.

With this arrangement and construction the feeder D can be rotated by a comparatively slow speed. In fact a surface speed equaling that of the apron 21ᵃ is quite sufficient.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a combine having a harvester and a thresher rearwardly thereof, a conveyor for conveying crop material rearwardly from the harvester to the thresher, a rotary feeder device across the entire width of the conveyor and cooperating with a rearwardly moving part of the conveyor to assist in moving the crop material from the harvester to the thresher, said feeder device having extensible and retractable crop engaging members, and means for extending the members as they rotate downwardly and thence rearwardly adjacent to and in conjunction with the rearwardly moving part of the conveyor.

2. In a combine having harvester and thresher mechanisms, a conveyor connecting the two mechanisms to convey crop materials rearwardly from one to the other, a rotary feeder disposed transversely above the conveyor and being of a length substantially equal to the width of the conveyor crop engaging members extending from the feeder to positively engage the crop material during the downward and rearward rotation of the feeder, and means for retracting the members during upward movement of the feeder rotation whereby the crop material will be disengaged for deposit on the conveyor.

3. In a harvester, a platform having a transversely arranged crop receiving surface, a longitudinally disposed conveyor extending from a point adjacent the forward edge of the platform so as to receive cut crop directly thereon, means for conveying crop deposited on the platform laterally of the conveyor transversely toward the forward portion of the conveyor, and a rotary feeder disposed over a forward part of the conveyor, said feeder having crop engaging members eccentrically adjustable with respect to the axis of the feeder, for engaging all of the cut crop and moving it downwardly and rearwardly into contact with respect to the upper surface of the conveyor.

4. In a harvester including a laterally extending platform, a transversely operating conveyor disposed over the platform to convey crop material longitudinally thereof, a longitudinal conveyor extending rearwardly from the platform and adapted to receive crop material from the transverse conveyor, and a rotary feeder arranged adjacent a forward part of the longitudinal conveyor, said feeder including a cylindrical part terminating in a tapered portion at the end toward the transversely operating conveyor.

5. In a combine, a harvester part having laterally projecting crop-receiving platforms and means for moving the crop inwardly thereover, a thresher part, an endless conveyor for conveying crop material from the inner ends of the platforms to the thresher part, a feeder arranged over the upper run of the conveyor to form a passageway therebetween, said feeder comprising a generally cylindrical member having retractible fingers projecting therefrom, and means for retracting said fingers as they move out of said passageway.

6. In a combine, a harvester part having aligned lateral grain augers, a thresher part, a conveyor for conveying crop material from the harvester part to the thresher part, and a feeder associated with the conveyor to form a material passageway therebetween, said feeder comprising a generally cylindrical member having retractible fingers projecting therefrom, and said member having tapered extensions at both ends thereof toward which the grain is fed by said lateral grain augers.

7. In a combine, a harvester part having a crop-cutting means, a thresher part, a conveyor for conveying crop material from the harvester part to the thresher part, and a feeder cooperating with the conveyor to feed crop material therebetween, said feeder comprising a generally cylindrical member having retractible fingers projecting therefrom, means for rotating the feeder in a direction such that the surface of the cylindrical member nearest the conveyor will move in the same feeding direction as the conveyor, a rotatable member disposed within the drum eccentrically with respect thereto, said arms being attached at their inner ends to said rotatable member whereby they will be projected and retracted when the drum and member are rotated about their respective axes.

8. In a combine, a harvester having laterally extending grain receiving platforms, a rearwardly disposed thresher, a conveyor disposed between the platforms and extending upwardly and rearwardly to the thresher, a feeder disposed over a forward portion of the conveyor to engage all the crop received by the platforms and conveyor and move it downwardly and rearwardly into contact with the upper, crop conveying surface of the conveyor, and conveyors for moving the crop inwardly over both platforms to the first mentioned conveyor, said feeder having reduced ends which cooperate with side portions of the first mentioned conveyor to form tapered throats for the reception of crop materials moved in by the platform conveyors.

9. In a combine, a harvester part having a crop receiving platform, a thresher part rearwardly of the harvester part, an endless belt conveyor extending from a point adjacent the forward edge of the platform, so as to receive grain directly thereon, thence horizontally rearwardly, and then upwardly and rearwardly to the thresher part, guides for holding the upper and lower runs of the conveyor down where it angles from horizontal to inclined operating positions, and a rotary feeder having projectable and retractible crop engaging members cooperating with the upper run of the conveyor near the lower end of the inclined portion thereof to move the grain downwardly and rearwardly into contact with the conveyor.

10. In a combine having a harvester part and a thresher part rearwardly thereof, the harvester part including a transversely extending platform and auger conveyor, an endless conveyor having an upper run for conveying cut crop rearwardly from the harvester part to the thresher part, said endless conveyor extending to a point adjacent the forward edge of the platform to directly receive crop material as it is cut and adapted to laterally receive crop material from the auger conveyor, a rotary drum shaped feeder disposed over a part of the endless conveyor and having peripherally arranged slidably mounted fingers for positively engaging the crop material and urging it downwardly and rearwardly into contact with the rearwardly moving upper run of the conveyor, and means for projecting and retracting the fingers as the feeder is rotated.

11. In a combine having a harvester part and a thresher part rearwardly thereof, the harvester part including a transversely extending crop receiving platform and crop moving conveyor, an endless conveyor for conveying cut crop from the conveyor of the harvester part to the thresher part, said endless conveyor extending to a forward part of the platform so as to directly receive some cut crop material thereon, a rotary drum feeder disposed over a forward part of the conveyor and having outwardly and inwardly movable peripherally arranged projections for positively engaging the crop material and urging it downwardly and rearwardly into contact with the upper run of the endless conveyor, said feeder and endless conveyor being operated at substantially the same surface speeds whereby upper and lower surface parts of the crop layer will be moved rearwardly at the same rate of speed, and means for intermittently actuating said projections inwardly and outwardly with respect to the surface of the drum feeder as the latter is rotated.

12. In a combine, a harvester part having a transversely operating conveyor, a thresher part rearwardly of the harvester part, an endless longitudinally arranged conveyor connecting the two parts to convey crop material delivered transversely by the harvester conveyor rearwardly to the thresher part, a rotary feeder disposed adjacent to the crop delivery end of the transverse conveyor and adjacent a crop receiving part of the longitudinal conveyor, crop engaging arms projecting from the feeder, means for rotating the feeder in a rearward direction at its under side, and means for alternately extending and retracting the arms as the feeder is rotated, said last mentioned means being operative to maintain the arms extended through the arc of feeder movement in a direction toward the longitudinal conveyor.

13. In a harvester, a transverse crop receiving platform, a longitudinal conveyor extending rearwardly from the platform to remove crop material therefrom, a transversely operating conveyor disposed over the platform to convey crop material therefrom to the first mentioned conveyor and in a direction substantially at right angles to the feeding direction of the first mentioned conveyor, and a rotary feeder arranged adjacent a forward part of the longitudinal conveyor to engage crop material moved in by the transverse conveyor, said feeder including crop engaging members that are automatically movable with respect to the feeder proper, as the latter rotates, to effectively engage and urge the crop material toward the longitudinal conveyor and then disengage the crop material.

14. In a harvester, a transverse crop receiving platform, a longitudinal conveyor extending rearwardly from the platform to remove crop material therefrom, a transversely operating conveyor disposed lengthwise of the platform to convey crop material thereover to the first mentioned conveyor, and a rotary feeder arranged adjacent a forward part of the longitudinal conveyor and adjacent the delivery end of the transverse conveyor to directly receive crop material from the transversely operating conveyor and urge it into contact with the longitudinal conveyor, said feeder including a cylindrical element having extensible crop engaging projections, and means for extending and retracting the projections as the feeder is rotated.

15. In a combine, a harvester part, a rearwardly disposed thresher part, a centrally and longitudinally disposed conveyor for conveying crop material from the harvester part to the thresher part, a pair of harvester part conveyors disposed one at each side of the first mentioned conveyor to move crop material inwardly from opposite sides thereof, a feeder disposed adjacent the central conveyor and adjacent the inner ends of the pair of conveyors, said feeder comprising a rotatable drum and crop engaging arms slidably projecting from the drum for projection and retraction with respect thereto, and means for projecting the arms as they move in an arcuate direction toward the central conveyor.

16. In a combine, a harvester having laterally extending grain receiving platforms, a rearwardly disposed thresher, a conveyor disposed between the platforms and extending upwardly and rearwardly to the thresher, a cylindrical feeder disposed over a forward portion of the conveyor and having a plurality of circumferentially and longitudinally distributed slidably mounted arms adapted to engage all the crop received by the platforms and conveyor and move it downwardly into contact with the upper, crop conveying surface of the conveyor, means for slidably actuating the arms and a pair of conveyors for moving the crop inwardly over both platforms to said feeder and to the first mentioned conveyor.

MARTIN RONNING.
KENNETH M. KEITH.

REFERENCES CITED

The following references are of record in the file of this patent:

UNITED STATES PATENTS

| Number | Name | Date |
|---|---|---|
| 1,896,626 | Innes | Feb. 7, 1933 |
| 2,112,922 | Millard | Apr. 5, 1938 |
| 2,133,143 | Innes | Oct. 11, 1938 |
| 2,292,958 | Millard et al | Aug. 11, 1942 |
| 2,311,865 | Pilcher | Feb. 23, 1943 |
| 2,327,864 | Brogard et al | Aug. 24, 1943 |

Certificate of Correction

Patent No. 2,455,905.

December 7, 1948.

MARTIN RONNING ET AL.

It is hereby certified that errors appear in the printed specification of the above numbered patent requiring correction as follows:

Column 3, line 62, for "arm 42" read *arms 42*; column 5, line 1, claim 1, after the word "device" insert *extending*; line 17, claim 2, after "conveyor" insert a comma; and that the said Letters Patent should be read with these corrections therein that the same may conform to the record of the case in the Patent Office.

Signed and sealed this 8th day of March, A. D. 1949.

[SEAL]

THOMAS F. MURPHY,
*Assistant Commissioner of Patents.*